United States Patent [19]
Morimoto

[11] Patent Number: 5,717,457
[45] Date of Patent: Feb. 10, 1998

[54] OUTPUT CIRCUIT OF A SOLID-STATE IMAGING DEVICE

[75] Inventor: Takashi Morimoto, Nara, Japan

[73] Assignee: Sharp Kabushiki Kaisha, Osaka, Japan

[21] Appl. No.: 339,772

[22] Filed: Nov. 15, 1994

[30] Foreign Application Priority Data

Mar. 24, 1994 [JP] Japan ................... 6-54098

[51] Int. Cl.$^6$ ................................. H04N 5/217
[52] U.S. Cl. ................. 348/241; 348/249; 348/250; 358/445
[58] Field of Search .................. 348/241, 248, 348/249, 303, 308, 250; 364/286; 358/445, 461, 529; H04N 5/217

[56] References Cited

U.S. PATENT DOCUMENTS

| | | | |
|---|---|---|---|
| 3,940,602 | 2/1976 | Lagnado et al. | 364/826 |
| 4,578,707 | 3/1986 | Ozawa et al. | 348/248 |
| 4,608,608 | 8/1986 | Nishizawa et al. | 348/248 |
| 4,886,986 | 12/1989 | Watanabe | 307/353 |
| 5,216,509 | 6/1993 | Hirasawa | 348/241 |
| 5,434,619 | 7/1995 | Yonemoto | 348/241 |

FOREIGN PATENT DOCUMENTS 62-55349  9/1981  Japan ................... H04N 5/335

*Primary Examiner*—Andrew Faile
*Assistant Examiner*—Andrew B. Christensen
*Attorney, Agent, or Firm*—David G. Conlin; Milton Oliver

[57] ABSTRACT

An output circuit of a solid-state imaging device has been improved. The output circuit receives a plurality of pixel signals in a dummy bit portion, an optical black portion and an effective pixel portion from a charge transfer device of the solid-state imaging device. The output circuit includes: a clamp circuit for clamping to a predetermined voltage a feedthrough level in a feedthrough period of each pixel signal output from a charge transfer device of the solid-state imaging device; a main sampling and holding circuit for sampling a signal level in a signal period of each pixel signal output from the clamp circuit and holding the signal level; a sub sampling and holding circuit for sampling an optical black level in a signal period of each pixel signal in the optical black portion output from the clamp circuit and holding the optical black level; a synchronous sampling and holding circuit for sampling the optical black level output from the sub sampling and holding circuit at a timing identical to that of the main sampling and holding circuit and holding the optical black level; and an arithmetic circuit for calculating the difference between the signal level output from the main sampling and holding circuit and the optical black level output from the synchronous sampling and holding circuit.

10 Claims, 10 Drawing Sheets

OUTPUT CIRCUIT OF A SOLID-STATE IMAGING DEVICE

BACKGROUND OF THE INVENTION

1. Field of the Invention

The present invention relates to an output circuit of a solid-state imaging device such as a video camera, and more particularly, to an output circuit of a solid-state imaging device which is capable of minimizing noise in signals output therefrom.

2. Description of the Related Art

A charge transfer device such as a charge coupled device (CCD) and a bucket brigade device (BBD) used for a solid-state imaging device deals with signals in the form of charges, and transfers such signal charges synchronously with externally supplied clock signals. An output circuit of the solid-state imaging device converts such signal charges transferred from the charge transfer device into voltage signals and outputs the converted voltage signals to a subsequent circuit.

FIG. 9 shows the configuration of a typical output circuit used for a CCD solid-state imaging device. At the output terminal of a CCD 21, signal charges transferred at timings of clock signals $H_1$, $H_2$, and the like are output through an output gate which is applied with a gate voltage $V_{OG}$, and supplied to a detection portion 22 of the output circuit. The detection portion 22 is substantially composed of a floating capacitor with a reset switch. A MOSFET (metal oxide semiconductor field effect transistor) 22a is used as the reset switch and a reverse-biased diode 22b is used as the floating capacitor. In the detection portion 22, the FET 22a is first turned on by setting a reset signal $\phi_R$ to a HIGH level, so that the diode 22b is applied with a reset voltage $V_{RD}$ through the FET 22a. Then, the reset signal $\phi_R$ is set to a LOW level so as to turn off the FET 22a. During the "off" state of the FET 22a, the potential at the diode 22b changes depending on the signal charge output from the CCD 21, thus effecting the conversion of the signal charge into a voltage. The potential at the diode 22b is then supplied to an amplification portion 23 of the output circuit which includes a source follower composed of MOSFETs 23a and 23b. In the amplification portion 23, the potential is amplified at high input impedance and low output impedance, and then output as a converted voltage signal $V_{OS}$.

Referring to FIG. 10, the reset signal $\phi_R$ is a pulse which becomes HIGH for a short period when the final transfer clock signal $H_1$ in the CCD 21 remains HIGH. Accordingly, the converted voltage signal $V_{OS}$ has three voltage levels: a high reset level $V_R$ (reset voltage $V_{RD}$) during the period when the reset signal $\phi_R$ is HIGH (a reset period $T_R$); a lower feedthrough level $V_{FT}$ during the period when the reset signal $\phi_R$ is LOW but the final transfer clock signal $H_1$ remains HIGH (a feedthrough period $T_{FT}$); a lowest signal level $V_S$ which corresponds to the signal charge output from the CCD 21 during the period from when the final transfer clock signal $H_1$ turns LOW until when the reset signal $\phi_R$ becomes HIGH (a signal period $T_S$). The reset period $T_R$, the feedthrough period $T_{FT}$, and the signal period $T_S$ form one pixel signal for one pixel. As shown in FIG. 9, one horizontal scanning period includes an effective pixel portion for forming actual images which is composed of a number of pixel signals. A dummy bit portion corresponding to a horizontal feedback period and an optical black portion for setting the reference of a black level both precede and follow the effective pixel portion. These portions also include a plurality of pixel signals. However, in the dummy bit portion, the signal level $V_S$ in the signal period $T_S$ is not the same as the signal level $V_S$ in the effective pixel portion, but is identical to the feedthrough level $V_{FT}$. In the optical black portion, it is an optical black level $V_{OB}$ which is the reference for the black level.

The CCD 21 is essentially a low noise device. The above output circuit composed of the detection portion 22 and the amplification portion 23 was originally developed to improve the signal-to-noise (S/N) ratio. With this output circuit, however, noise is still generated when the FET 22a of the detection portion 22 is turned on for the reset (hereinafter, such noise is referred to as reset noise). This causes a variation in the reset level $V_R$ in the reset period $T_R$ of the converted voltage signal $V_{OS}$, which in turn varies all the signal levels, resulting in generating noise in the signal level $V_S$ in the signal period $T_S$.

In order to eliminate such reset noise, a correlated double sampling (CDS) method is conventionally employed. In this method, the signal level $V_S$ in the signal period $T_S$ is adjusted using the feedthrough level $V_{FT}$ in the feedthrough period $T_{FT}$ as a reference. This is accomplished by providing an additional output circuit shown in FIG. 11 in succession to the output circuit shown in FIG. 9.

Referring to FIG. 11, the converted voltage signal $V_{OS}$ output from the amplification portion 23 of the output circuit of FIG. 9 is supplied to a clamp circuit 24 through a coupling capacitor $C_C$. An output from the clamp circuit 24 is then supplied to a sampling and holding circuit 25. In the clamp circuit 24, the converted voltage signal $V_{OS}$ passes through a clamp capacitor $C_{CP}$ located between a first buffer amplifier 24a and a second buffer amplifier 24b both of which have high input impedance and low input impedance. A node located between the clamp capacitor $C_{CP}$ and the second buffer amplifier 24b is connected to a clamp voltage $V_{CP}$ through a clamp switch 24c. The clamp switch 24c is turned on only in the feedthrough period $T_{FT}$ of each pixel signal under the control of a clamp clock $F_{CDS}$. Thus, the feedthrough level $V_{FT}$ in the feedthrough period $T_{FT}$ is clamped to the clamp voltage $V_{CP}$, so that the converted voltage signal $V_{OS}$ is fixed.

In the sampling and holding circuit 25, the output signal from the clamp circuit 24 is stored in a sampling and holding capacitor $C_{SH}$ through a sampling switch 25a. At the same time, a voltage at the terminal of the sampling and holding capacitor $C_{SH}$ is output through a buffer amplifier 25b with high input impedance and low output impedance. The sampling switch 25a is on only during the signal period $T_S$ of each pixel signal under the control of a sampling clock $F_S$. Accordingly, the sampling and holding circuit 25 extracts only the signal level $V_S$ in the signal period $T_S$ of each pixel signal output from the clamp circuit 24, and outputs the extracted signal as an output signal $V_{OUT}$.

Thus, as shown in FIG. 12, the feedthrough level $V_{FT}$ in the feedthrough period $T_{FT}$ of each pixel signal is first clamped to the clamp voltage $V_{CP}$ by the clamp circuit 24. This allows the signal level $V_S$ in the signal period $T_S$ to contain only signal components based on the feedthrough level $V_{FT}$ as a reference, eliminating variation caused by reset noise. The sampling and holding circuit 25 then extracts and outputs only the thus-processed signal level $V_S$ free from variation caused by reset noise. As a result, the S/N ratio of the output signal $V_{OUT}$ is improved.

The reset noise can also be eliminated by using an output circuit disclosed in Japanese Patent Publication No. 62-55349. In this output circuit, the signal level $V_S$ in the signal period $T_S$ is adjusted using the reset level $V_R$ in the reset period $T_R$ as a reference. This is accomplished by using an output circuit as shown in FIG. 13 instead of the output circuit of the CDS method shown in FIG. 11.

According to the output circuit of FIG. 13, the converted voltage signal $V_{OS}$ output from the amplification portion 23 of the output circuit of FIG. 9 is sample-held by a first sampling and holding circuit 26 and a second sampling and holding circuit 27 through a coupling capacitor $C_C$. The output from the second sampling and holding circuit 27 is sample-held again by a third sampling and holding circuit 28. The difference between the outputs from the first sampling and holding circuit 26 and the third sampling and holding circuit 28 is calculated and amplified by a differential amplifier 29. As shown in FIG. 14, the second sampling and holding circuit 27 samples the reset level $V_R$ in the reset period $T_R$ of each pixel signal, while the first and third sampling and holding circuits 26 and 28 sample the signal level $V_S$ in the signal period $T_S$ of each pixel signal.

Thus, the reset level $V_R$ in the reset period $T_R$ of each pixel signal is delayed and input into the differential amplifier 29 together with the signal level $V_S$ in the signal period $T_S$. As a result, the differentially amplified output signal $V_{OUT}$ includes the signal level $V_S$ only containing components based on the reset level $V_R$ as a reference. This eliminates the influence of a variation in the reset level $V_R$ which may be caused by reset noise. This output circuit is also advantageous in that, because the samplings in the first and the third sampling and holding circuits 26 and 28 are synchronous, pulse invasion which may occur at the samplings in these circuits 26 and 28 can be canceled in the differential amplifier 29, substantially preventing such an invading pulse from influencing the output signal $V_{OUT}$.

However, the above conventional output circuits have the following problems. In a later signal processing of the output signal $V_{OUT}$ output from the above conventional output circuits, the optical black level $V_{OB}$ in the signal period $T_S$ in the optical black portion is repeatedly clamped since the level $V_{OB}$ is used as a reference of the black level. The optical black level $V_{OB}$ however tends to vary due to dark current and smears in the CCD 21. The dark current is a current thermally excited in a semiconductor. This varies with pixels depending on the structure of devices and is affected by temperature. Smears are generated by the diffusion of charges to adjacent pixels and transfer paths when intensive light is partially incident to the CCD 21. This varies depending on the conditions of incident light. Further, the optical black level $V_{OB}$ is a voltage level different from the feedthrough level $V_{FT}$ in the feedthrough period $T_{FT}$ and the signal level $V_S$ in the signal period $T_S$ in the dummy bit portion which is identical to the feedthrough level $V_{FT}$. This produces an "OB difference" between these levels. When the OB difference becomes greater due to, for example, a variation in the optical black level $V_{OB}$ caused by temperature rise and the like, the S/N ratio may be reduced in the later signal processing of the output signal $V_{OUT}$. Yet another problem is that, when the black level $V_{OB}$ drastically varies due to smears and the like, the clamp operation can no more follow the variation. This results in further reducing the S/N ratio.

According to the conventional CCD output circuits, the signal level $V_S$ in the signal period $T_S$ is adjusted using the feedthrough level $V_{FT}$ in the feedthrough period $T_{FT}$ or the reset level $V_R$ in the reset period $T_R$ as a reference. Accordingly, though reset noise can be eliminated from the output signal $V_{OUT}$, a variation in the optical black level $V_{OB}$ is not eliminated but appears in the output signal $V_{OUT}$.

The present invention aims at providing an output circuit of a solid-state imaging device capable of eliminating the influence of a variation in the optical black level, not only eliminating the influence of reset noise and pulse invasion.

SUMMARY OF THE INVENTION

The output circuit of a solid-state imaging device of the invention, which receives a plurality of pixel signals in a dummy bit portion, an optical black portion and an effective pixel portion from a charge transfer device of the solid-state imaging device, includes: a clamp circuit for clamping to a predetermined voltage a feedthrough level in a feedthrough period of each pixel signal output from a charge transfer device of the solid-state imaging device; a main sampling and holding circuit for sampling a signal level in a signal period of each pixel signal output from the clamp circuit and holding the signal level; a sub sampling and holding circuit for sampling an optical black level in a signal period of each pixel signal in the optical black portion output from the clamp circuit and holding the optical black level; a synchronous sampling and holding circuit for sampling the optical black level output from the sub sampling and holding circuit at a timing identical to that of the main sampling and holding circuit and holding the optical black level; and an arithmetic circuit for calculating the difference between the signal level output from the main sampling and holding circuit and the optical black level output from the synchronous sampling and holding circuit.

In one embodiment of the invention, the sub sampling and holding circuit samples the optical black level in the signal period of each pixel signal in the optical black portion and a feedthrough level in a signal period of each pixel signal in the dummy bit portion output from the clamp circuit, and holds the optical black level or the feedthrough level, and the synchronous sampling and holding circuit samples the optical black level or the feedthrough level output from the sub sampling and holding circuit at a timing identical to that of the main sampling and holding circuit, and holds the optical black level or the feedthrough level.

According to another aspect of the invention, the output circuit of a solid-state imaging device, the solid-state imaging device being of an interline transfer type including a charge transfer device having: pairs of vertical transfer portions for receiving signal charges injected thereinto in parallel from rows of light receiving elements and transferring the received signal charges in series in a vertical direction, each of the pairs of vertical transfer portions being disposed substantially symmetrically on the both sides of each of the rows of light receiving elements so that signal charges be injected into the pair of vertical transfer portions from the same light receiving elements at different times when the amounts of the signal charges are different; and a horizontal transfer portion for transferring the signal charges transferred from the pairs of vertical transfer portions in a horizontal direction, the output circuit receiving a plurality of pixel signals in a dummy bit portion, an optical black portion and an effective pixel portion from the charge transfer device, includes: a clamp circuit for clamping to a predetermined voltage a feedthrough level in a feedthrough period of each pixel signal output from the horizontal transfer portion; a first sampling and holding circuit for sampling a signal level in a signal period of every other pixel signal output from the clamp circuit and holding the signal level; a second sampling and holding circuit for sampling a signal level in a signal period of remaining pixel signals output from the clamp circuit which are not sampled by the first sampling and holding circuit and holding the signal level; a synchronous sampling and holding circuit for sampling the signal level output from the second sampling and holding circuit at a timing identical to that of the first sampling and holding circuit and holding the signal level; and an arithmetic circuit for calculating the difference between the signal levels output from the first sampling and holding circuit and the synchronous sampling and holding circuit.

According to still another aspect of the invention, the output circuit of a solid-state imaging device, the solid-state imaging device being of an interline transfer type including a charge transfer device having: pairs of vertical transfer portions for receiving signal charges injected thereinto in parallel from rows of light receiving elements and transferring the received signal charges in series in a vertical direction, each of the pairs of vertical transfer portions being disposed substantially symmetrically on both sides of each row of light receiving elements so that signal charges be injected into the pair of vertical transfer portions from the same light receiving elements at different times when the amounts of the signal charges are different; and a horizontal transfer portion for transferring the signal charges transferred from the pairs of vertical transfer portions in a horizontal direction, the output circuit receiving a plurality of pixel signals in a dummy bit portion, an optical black portion and an effective pixel portion from the charge transfer device, includes: a clamp circuit for clamping to a predetermined voltage a feedthrough level in a feedthrough period of each pixel signal output from the horizontal transfer portion; a first main sampling and holding circuit for sampling a signal level in a signal period of every other pixel signal output from the clamp circuit and holding the signal level; a first sub sampling and holding circuit for sampling an optical black level in a signal period of each pixel signal in the optical black portion among the pixel signals which are output from the clamp circuit and sampled by the first main sampling and holding circuit and holding the optical black level; a second main sampling and holding circuit for sampling a signal level in a signal period of pixel signals which are not sampled by the first main sampling and holding circuit and holding the signal level; a second sub sampling and holding circuit for sampling an optical black level in a signal period of each pixel signal in the optical black portion among the pixel signals which are output from the clamp circuit and sampled by the second main sampling and holding circuit and holding the optical black level; a first arithmetic circuit for calculating the sum of the optical black level output from the first sub sampling and holding circuit and the signal level output from the second main sampling and holding circuit and subtracting from the sum the optical black level output from the second sub sampling and holding circuit; a synchronous sampling and holding circuit for sampling an arithmetic signal output from the first arithmetic circuit at a timing identical to that of the first main sampling and holding circuit and holding the arithmetic signal; and a second arithmetic circuit for calculating the difference between the signal level output from the first main sampling and holding circuit and the arithmetic signal output from the synchronous sampling and holding circuit.

In one embodiment of the invention, the first sub sampling and holding circuit samples the optical black level in the signal period of each pixel signal in the optical black portion and a feedthrough level in a signal period of every pixel signal in the dummy bit portion among the pixel signals output from the clamp circuit and sampled by the first main sampling and holding circuit, and holds the optical black level or the feedthrough level, the second sub sampling and holding circuit samples the optical black level in the signal period of each pixel signal in the optical black portion and a feedthrough level in a signal period of each pixel signal in the dummy bit portion among the pixel signals output from the clamp circuit and sampled by the second main sampling and holding circuit, and holds the optical black level or the feedthrough level, and the first arithmetic circuit calculates the sum of the optical black level or the feedthrough level output from the first sub sampling and holding circuit and the signal level output from the second main sampling and holding circuit and subtracting from the sum the optical black level or the feedthrough level output from the second sub sampling and holding circuit.

In one embodiment of the invention the charge transfer device is a CCD.

Thus, according to the output circuits of the present invention, reset noise can be eliminated from the signal level (including the optical black level in the signal period of each pixel signal in the optical black portion and the feedthrough level in the signal period of each pixel signal in the dummy bit portion) by clamping the feedthrough level in the feedthrough period of each pixel signal to a predetermined voltage. Further, since the synchronous sampling and holding circuit effects sampling at the same timing as the main or first sampling and holding circuit, pulse invasion which may occur at samplings can be canceled in the arithmetic circuit.

According to the output circuit of the first embodiment of the present invention, the difference between the signal level sample-held by the main sampling and holding circuit and the optical black level sample-held by the sub sampling and holding circuit is calculated by the arithmetic circuit. This results in: (1) In the optical black portion, since the signal level and the optical level sample-held by the main sampling and holding circuit and the sub sampling and holding circuit respectively are identical to each other, the output from the arithmetic circuit is always a fixed value (zero), which can be used as a reference for the black level in a subsequent signal processing. (2) In the effective pixel portion, since the latest optical black level is subtracted from the signal level of each pixel signal, the output from the arithmetic circuit is always a precise signal level uninfluenced by a variation in the optical black level, thus eliminating an influence of such a variation.

As a result, the output circuit of the first embodiment can output the signal level free from the influence of a variation in the optical black level, as well as influences of reset noise and pulse invasion, realizing an output signal with a high S/N ratio.

Alternatively, since the signal level and the feedthrough level sample-held by the main sampling and holding circuit and the sub sampling and holding circuit respectively are identical to each other in the dummy bit portion, it is possible to keep the output from the arithmetic circuit in the dummy bit portion in the same fixed value as the optical black level by sampling the signal level in the dummy bit portion in the sub sampling and holding circuit.

According to the second embodiment of the present invention, signal charges output from the pairs of vertical transfer portions are alternately transferred in the horizontal transfer portion. Since each of the pairs of vertical transfer portions are disposed substantially symmetrically on both sides of each row of light receiving elements, they are substantially equally influenced by a variation in the signal level caused by dark current and smears. Accordingly, by calculating the difference between the two adjacent signal levels sample-held by the first sampling and holding circuit and the second sampling and holding circuit by the arithmetic circuit, such a variation in the signal level can be eliminated. Since one of the pair of vertical transfer portions receives a signal charge from the corresponding light receiving element at a timing when the signal charge is almost absent in the light receiving element, the effective signal level will not be reduced by the calculation.

As a result, the output circuit of the second embodiment can output the signal level free from the influence of dark current and smears which may cause a variation in the optical black level, as well as influences of reset noise and pulse invasion, realizing an output signal with a high S/N ratio.

By simply combining the first and second embodiments of the present invention, an output circuit which cannot only eliminate influences of dark current and smears causing a variation in the optical black level, but also eliminate any influence of a variation in the optical black level can be provided. In this case, as in the first embodiment, the signal level in the dummy bit portion may be made identical to the optical black level. However, the structure of such a combined output circuit is complicated because it needs two sets of the main sampling and holding circuit, the sub sampling and holding circuit, the synchronous sampling and holding circuit, and the arithmetic circuit for the pairs of vertical transfer portions. According to the output circuit of the third embodiment of the present invention, the difference between the outputs from the second main sampling and holding circuit and the second sub sampling and holding circuit is added to the output from the first sub sampling and holding circuit by the first arithmetic circuit, saving one synchronous sampling and holding circuit and thus simplifying the configuration of the output circuit.

Thus, the invention described herein makes possible the advantage of providing an output circuit of a solid-state imaging device in which the influence of a variation in the optical black level or the influence of dark current and smears causing a variation in the optical black level can be eliminated, as well as the influence of reset noise and pulse invasion, and the OB difference is eliminated, so as to provide output signals with a high S/N ratio and facilitate subsequent signal processing.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

(EXAMPLE 1)

Figure 1:
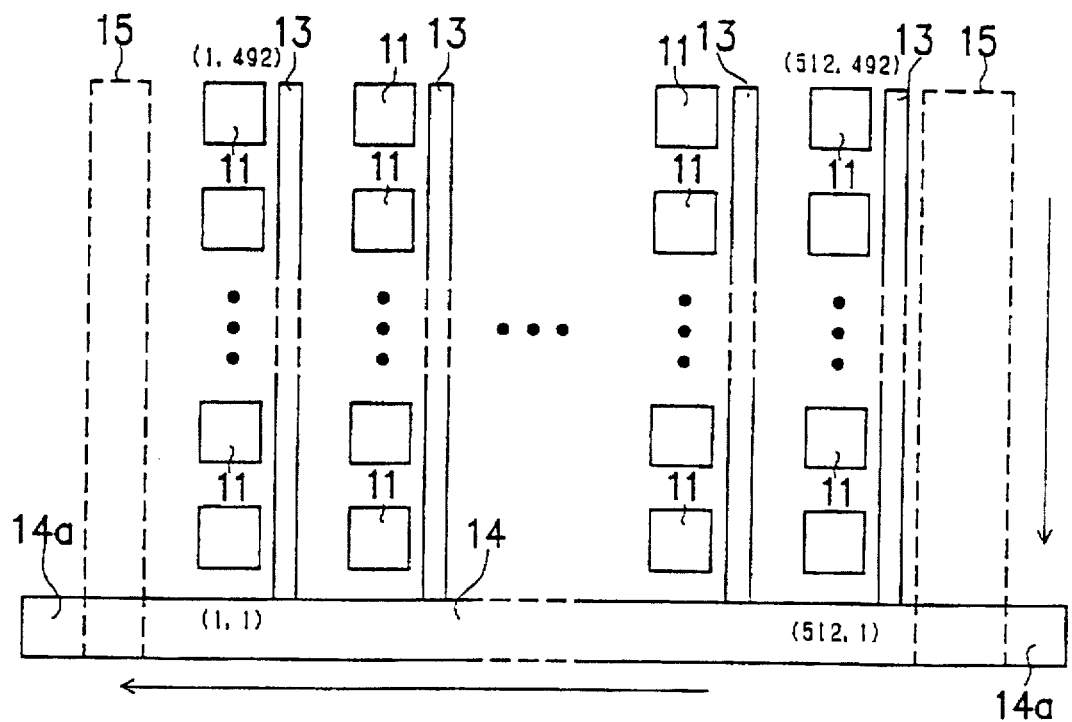
FIG. 1 is a block diagram of a CCD solid-state imaging device used in a first example according to the present invention.
Figure 2:
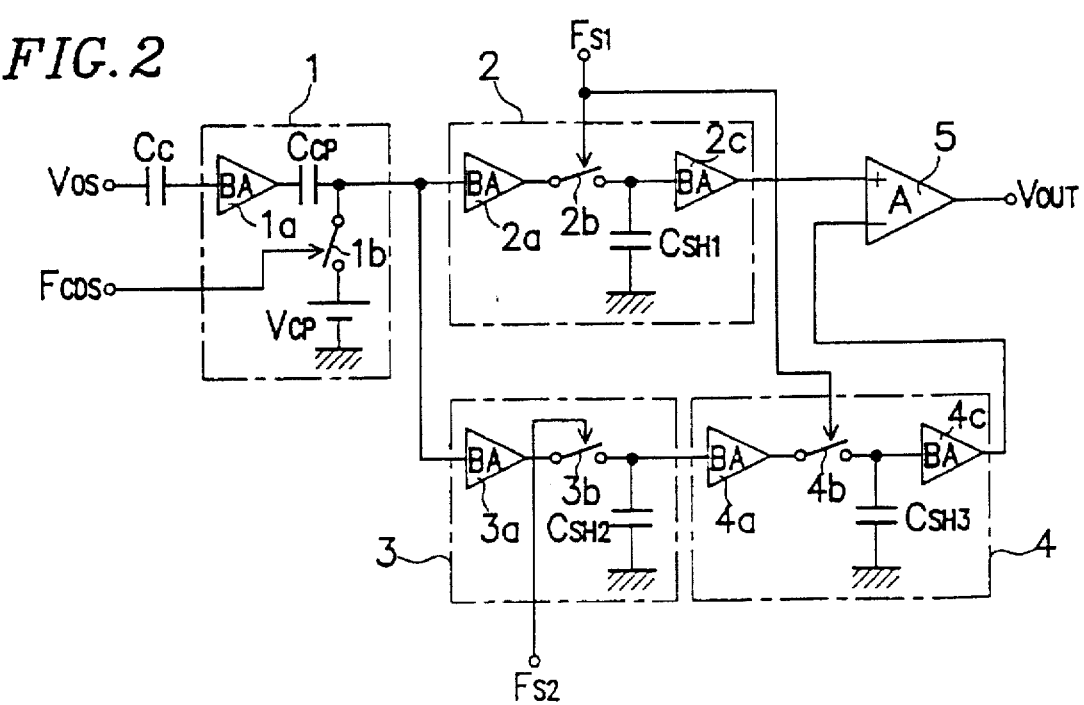
FIG. 2 is a circuit block diagram of an output circuit of a CCD solid-state imaging device, as a first example according to the present invention.
Figure 3:
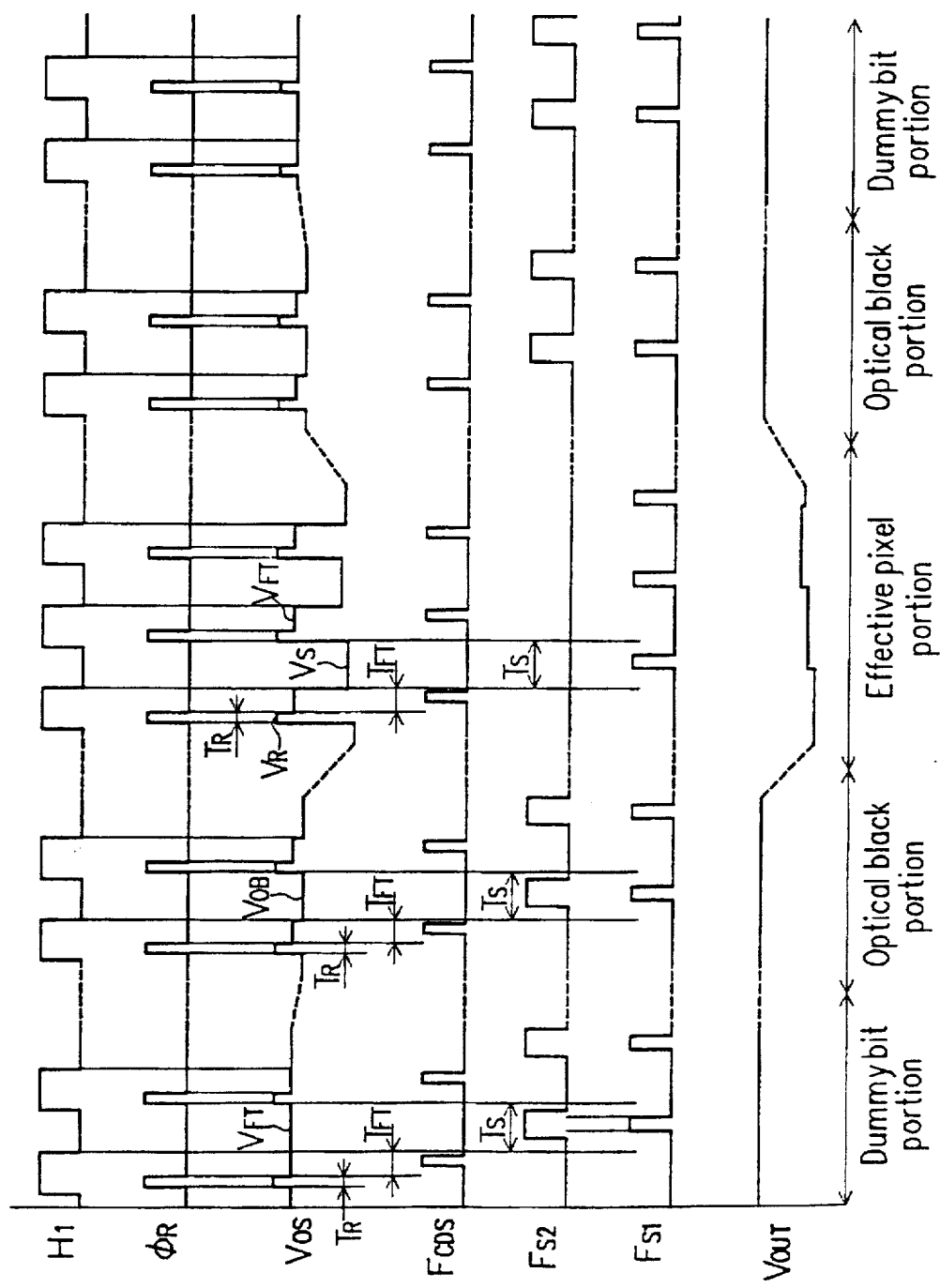
FIG. 3 is a time chart of various output signals in one horizontal scanning period for the output circuit of the first example.

A first embodiment of the present invention will be described with reference to FIGS. 1 to 3. FIG. 1 is a block diagram showing the structure of a CCD solid-state imaging device. FIG. 2 is a circuit block diagram of an output circuit of a CCD solid-state imaging device, and FIG. 3 is a time chart of various output signals for the output circuit in one horizontal scanning period.

This example relates to an output circuit for an interline transfer type CCD solid-state imaging device having a vertical transfer portions as shown in FIG. 1. The CCD solid-state imaging device for this example includes 512× 492 photodiodes 11 to form an effective pixel portion. The photodiodes 11 act as light receiving elements which are arranged in a matrix as shown in FIG. 1. A vertical transfer portion 13 composed of CCD is disposed on a side of each column of 492 photodiodes 11. Signal charges stored in the photodiodes 11 are injected into the vertical transfer portion 13 once every field period (1/60 seconds). The vertical transfer portion 13 then sequentially transfers the injected signal charges along a direction in which the vertical transfer portion 13 elongates before the start of the next field period.

A horizontal transfer portion 14 is disposed at the bottom ends of the vertical transfer portions 13, so that the signal charges output sequentially from the vertical transfer portions 13 are transferred horizontally in series. Optical black areas 15 are formed on the outermost sides of the array of photodiodes 11. The horizontal transfer portion 14 includes portions located under the optical black areas 15 and dummy bits 14a located at the both ends thereof. Each of the dummy bits 14a is composed of only a transfer portion. Thus, the horizontal transfer portion 14 first outputs pixel signals in one of the dummy bits 14a and pixel signals corresponding to one of the optical black areas 15 sequentially. Then, it outputs effective pixel signals transferred from the vertical transfer portions 13, followed by pixel signals corresponding to the other optical black area 15 and pixel signals in the other dummy bit 14a.

Figure 9:
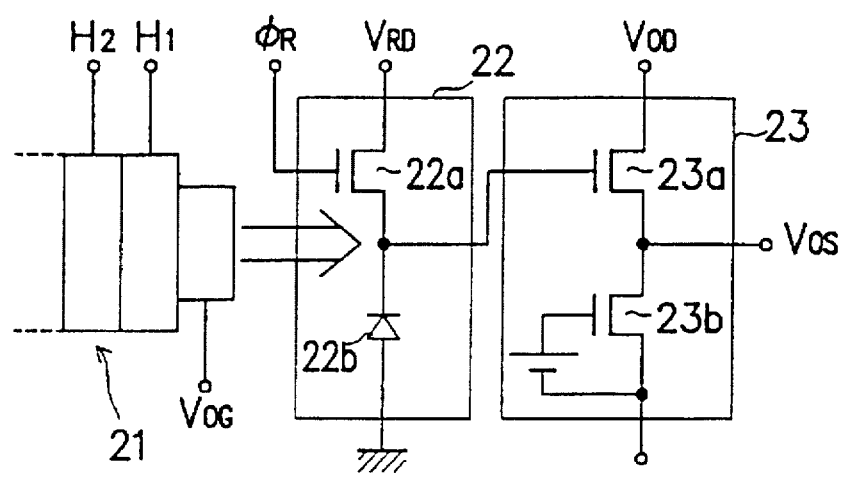
FIG. 9 is a circuit block diagram showing a basic configuration of a conventional output circuit of a CCD solid-state imaging device.
Figure 10:
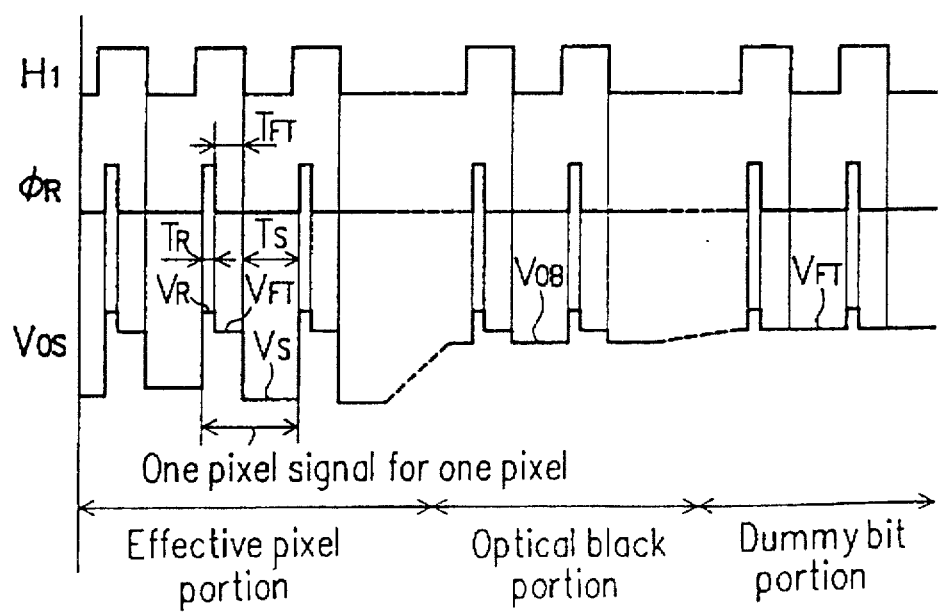
FIG. 10 is a time chart of various output signals for the output circuit of FIG. 9.

The following description refers to the case where the output circuit of FIG. 2 is additionally disposed in succession to the output circuit of FIG. 9 of the CCD solid-state imaging device. As shown in FIG. 3, the CCD solid-state imaging device first outputs a plurality of pixel signals in the dummy bit portion and a plurality of pixel signals in the optical black portion. Then, a number of pixel signals in the effective pixel portion are output in series, followed by a plurality of pixel signals in the optical black portion and a plurality of pixel signals in the dummy bit portion. All of these pixel signals are output sequentially in one horizontal scanning period. As described earlier, in the converted voltage signal $V_{OS}$ output from the output circuit of FIG. 9, each pixel signal is divided into the reset period $T_R$, the feedthrough period $T_{FT}$, and the signal period $T_S$, in which the voltage is in the reset level $V_R$, the feedthrough level $V_{FT}$, and the signal level $V_S$, respectively. In the dummy bit portion, the signal level $V_S$ in the signal period $T_S$ is identical to the feedthrough level $V_{FT}$, and in the optical black portion, it is equal to the optical black level $V_{OB}$.

Figure 11:
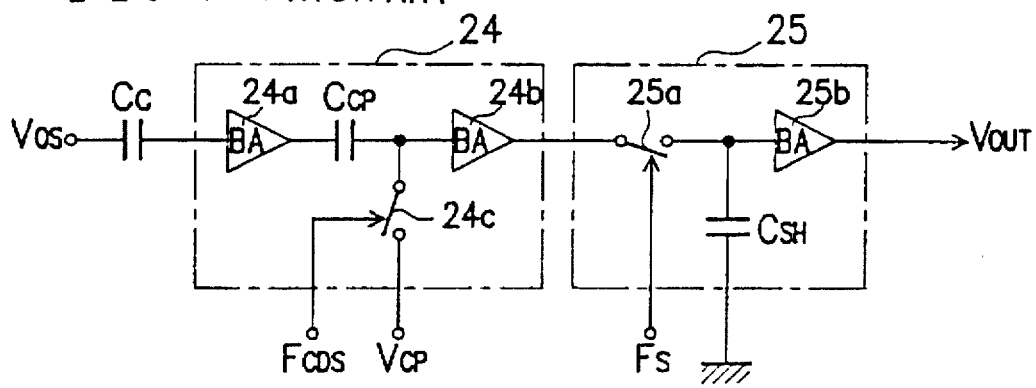
FIG. 11 is a circuit block diagram of a conventional output circuit employing a correlated double sampling (CDS) method.
Figure 12:
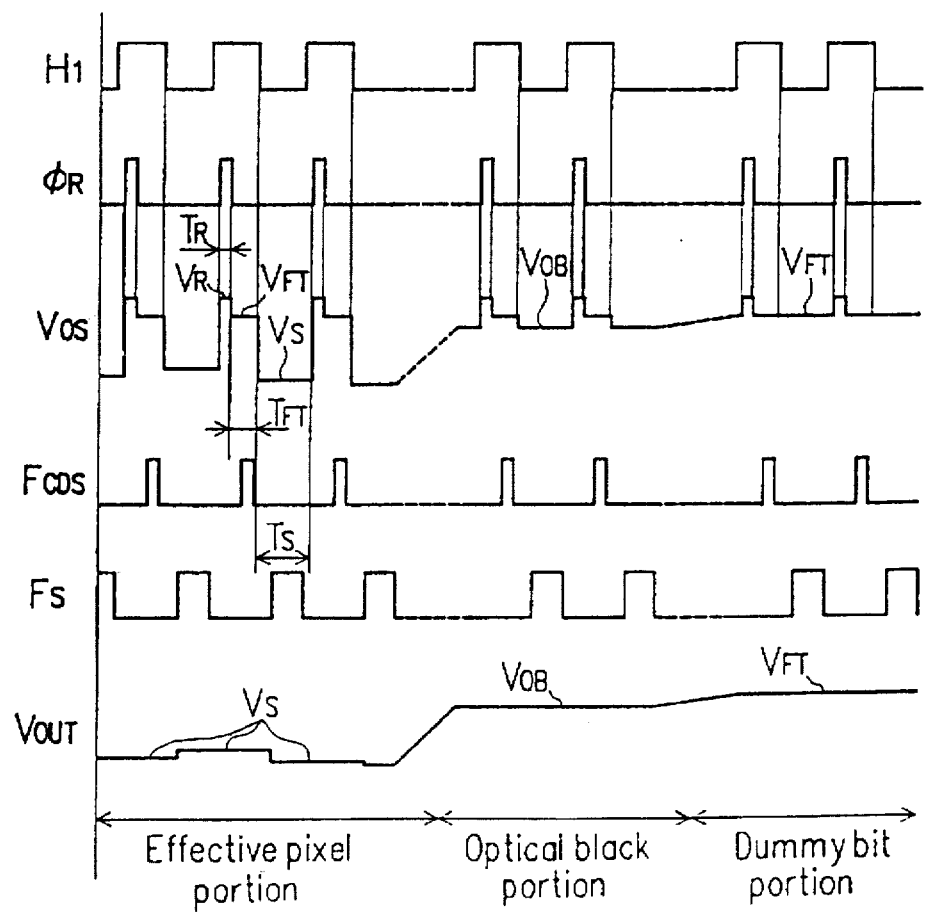
FIG. 12 is a time chart of various output signals for the output circuit of FIG. 11.
Figure 13:
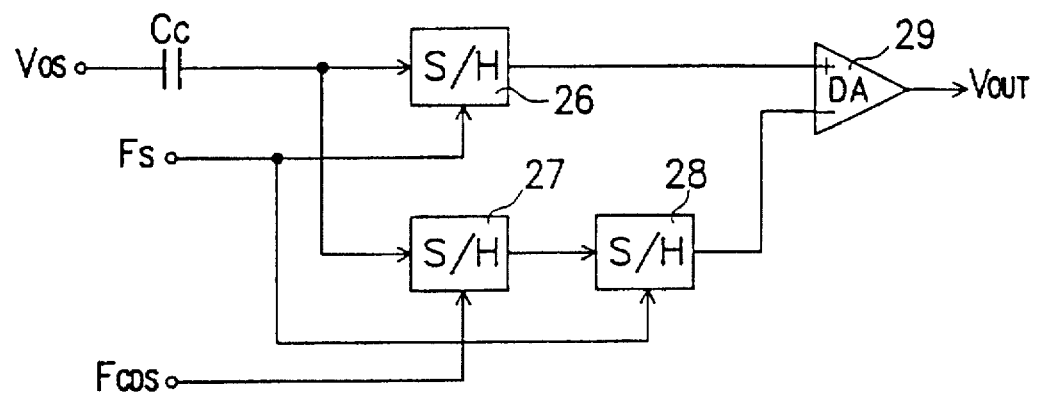
FIG. 13 is a circuit block diagram of another conventional output circuit.
Figure 14:
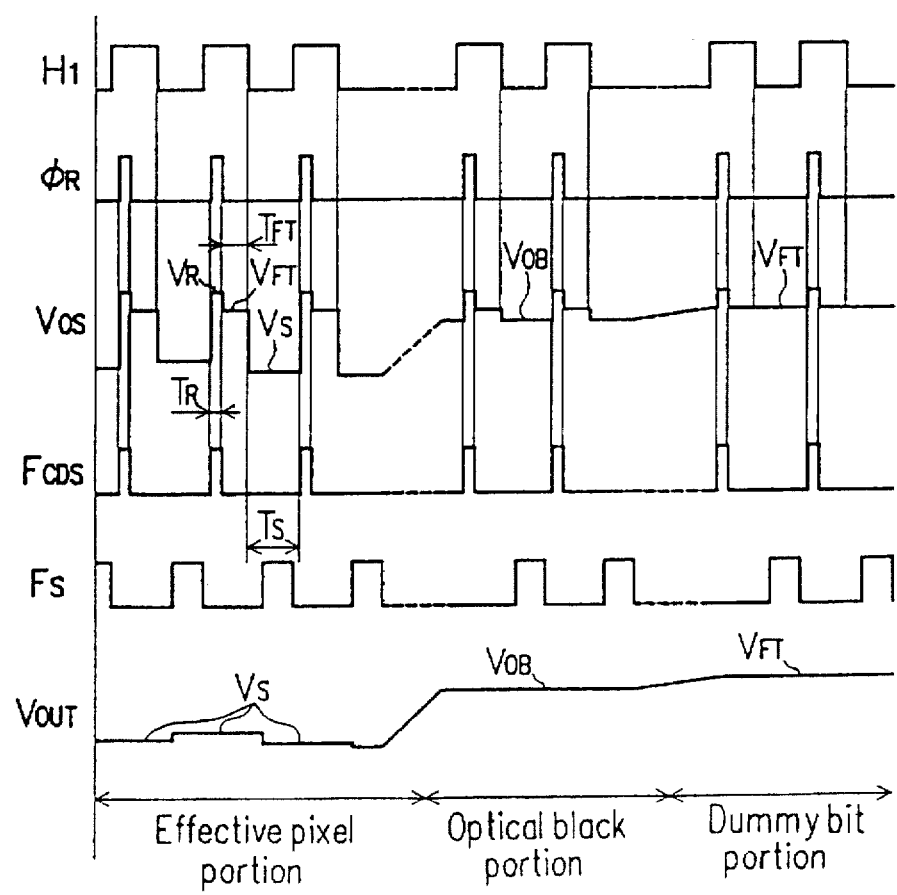
FIG. 14 is a time chart of various output signals for the output circuit of FIG. 13.

The output circuit of FIG. 2 includes a clamp circuit 1, a main sampling and holding circuit 2, a sub sampling and holding circuit 3, a synchronous sampling and holding circuit 4, and a differential amplifier 5. The converted voltage signal $V_{OS}$ is input into the clamp circuit 1 through a coupling capacitor $C_C$. The clamp circuit 1 has substantially the same configuration as that of the clamp circuit 24 of FIG. 11. In the clamp circuit 1, the converted voltage signal $V_{OS}$ passes through a buffer amplifier 1a with high input impedance and low output impedance and a clamp capacitor $C_{CP}$. A node located downstream of the output terminal of the clamp capacitor $C_{CP}$ is connected to a clamp voltage $V_{CP}$ through a clamp switch 1b. The clamp switch 1b is turned on only in the feedthrough period $T_{FT}$ of each pixel signal under the control of a clamp clock $F_{CDS}$.

The output of the clamp circuit 1 is connected to the inputs of the main sampling and holding circuit 2 and the sub sampling and holding circuit 3. The output of the sub sampling and holding circuit 3 is connected to the input of the synchronous sampling and holding circuit 4. The sampling and holding circuits 2 to 4 have substantially the same configuration as that of the sampling and holding circuit 25 of FIG. 11. The main sampling and holding circuit 2 receives the output signal from the clamp circuit 1 through a first buffer amplifier 2a with high input impedance and low output impedance, and stores the signal in a sampling and holding capacitor $C_{SH1}$ through a sampling switch 2b. At the same time, it outputs a voltage at the terminal of the sampling and holding capacitor $C_{SH1}$ through a second buffer amplifier 2c. The sampling switch 2b is turned on only in the signal period $T_S$ of each pixel signal in the effective pixel portion, the dummy bit portion, and the optical black portion under the control of a sampling clock $F_{S1}$, so as to sample and hold the signal level $V_S$ of each pixel signal.

The sub sampling and holding circuit 3 receives the output signal from the clamp circuit 1 through a buffer amplifier 3a with high input impedance and low output impedance, and stores the signal in a sampling and holding capacitor $C_{SH2}$ through a sampling switch 3b. At the same time, it outputs a voltage at the terminal of the sampling and holding capacitor $C_{SH2}$. The sampling switch 3b is turned on only in the signal period $T_S$ of each pixel signal in the dummy bit portion and the optical black portion under the control of a sampling clock $F_{S2}$, so as to sample and hold the signal level $V_S$ of each pixel signal. The sampling clocks $F_{S1}$ and $F_{S2}$ are active in the same signal period $T_S$ of each pixel signal in the dummy bit portion and the optical black portion. For this reason, the pulse width of the sampling clock $F_{S2}$ is made wider than that of the sampling clock $F_{S1}$.

The synchronous sampling and holding circuit 4 receives the output signal from the sub sampling and holding circuit 3 through a first buffer amplifier 4a with high input impedance and low output impedance, and stores the signal in a sampling and holding capacitor $C_{SH3}$ through a sampling switch 4b. At the same time, it outputs a voltage at the terminal of the sampling and holding capacitor $C_{SH3}$ through a second buffer amplifier 4c with high input impedance and low output impedance. The sampling switch 4b is turned on under the control of the same sampling clock $F_{S1}$ that is used for the main sampling and holding circuit 2, so that the synchronous sampling and holding circuit 4 samples and holds the signal once sample-held by the sub sampling and holding circuit 3 again at the same timing as the main sampling and holding circuit 2.

The output of the main sampling and holding circuit 2 is connected to the non-inverting input terminal of the differential amplifier 5, while the output of the synchronous sampling and holding circuit 4 is connected to the inverting input thereof. The differential amplifier 5 is a circuit which outputs the difference in the input level between the non-inverting input and the inverting input after amplifying the difference. The differential amplifier 5 is composed of, for example, an operational amplifier which realizes negative feedback. The output from the differential amplifier 5 is the output signal $V_{OUT}$ of the output circuit of this example.

The operation of the output circuit with the above configuration will be described with reference to the time chart of FIG. 3.

In the clamp circuit 1, the feedthrough level $V_{FT}$ in the feedthrough period $T_{FT}$ of each pixel signal of the converted voltage signal $V_{OS}$ is clamped to the clamp voltage $V_{CP}$ by the clamp clock $F_{CDS}$. Thus, the pixel signal output from the clamp circuit 1 is free from influence of a variation in the reset level $V_R$ in the reset period $T_R$ due to reset noise.

The signal level $V_S$ in the signal period $T_S$ of each pixel signal in the dummy bit portion and the optical black portion, i.e., the feedthrough level $V_{FT}$ in the dummy bit portion and the optical black level $V_{OB}$ in the optical black portion, is sample-held both in the main sampling and holding circuits 2, and in the combination of the sub sampling and holding circuit 3 and the synchronous sampling and holding circuit 4, and supplied to the differential amplifier 5. This means that the input levels at the non-inverting input terminal and the inverting input terminal of the differential amplifier 5 are always the same in the dummy bit portion and the optical black portion. As a result, the levels of the output signal $V_{OUT}$ in the dummy bit portion and the optical black portion can be made homologous so as to be used as a reference of the black level in a subsequent signal processing.

The signal level $V_S$ in the signal period $T_S$ of each pixel signal in the effective pixel portion is sample-held in the main sampling and holding circuit 2, and supplied to the non-inverting input terminal of the differential amplifier 5. However, the sub sampling and holding circuit 3 does not sample and hold the signal level $V_S$ in the effective pixel portion, but keeps sampling and holding the optical black level $V_{OB}$ in the signal period $T_S$ of the last pixel signal in the precedent optical black portion and outputs the voltage to the synchronous sampling and holding circuit 4. The synchronous sampling and holding circuit 4 samples and holds again the output from the sub sampling and holding circuit 3 synchronously with the main sampling and holding circuit 2, and supplies it to the inverting input terminal of the differential amplifier 5. As a result, the output signal $V_{OUT}$ in the effective pixel portion corresponds to an amplified value of the difference between the signal level $V_S$ of each pixel signal and the latest optical black level $V_{OB}$. Accordingly, the influence of a possible variation in the optical black level $V_{OB}$ can be eliminated. Further, since the samplings in the main sampling and holding circuit 2 and the synchronous sampling and holding circuit 4 are synchronous, an influence of pulse invasion which may occur at the samplings can be canceled in the differential amplifier 5.

Thus, according to the output circuit of this example, the influence of a variation in the optical black level $V_{OB}$, as well as influences of reset noise and pulse invasion can be eliminated from the output signal $V_{OUT}$. Moreover, the level of the output signal $V_{OUT}$ in the dummy bit portion and the optical black portion can be made homologous.

(EXAMPLE 2)

Figure 4:
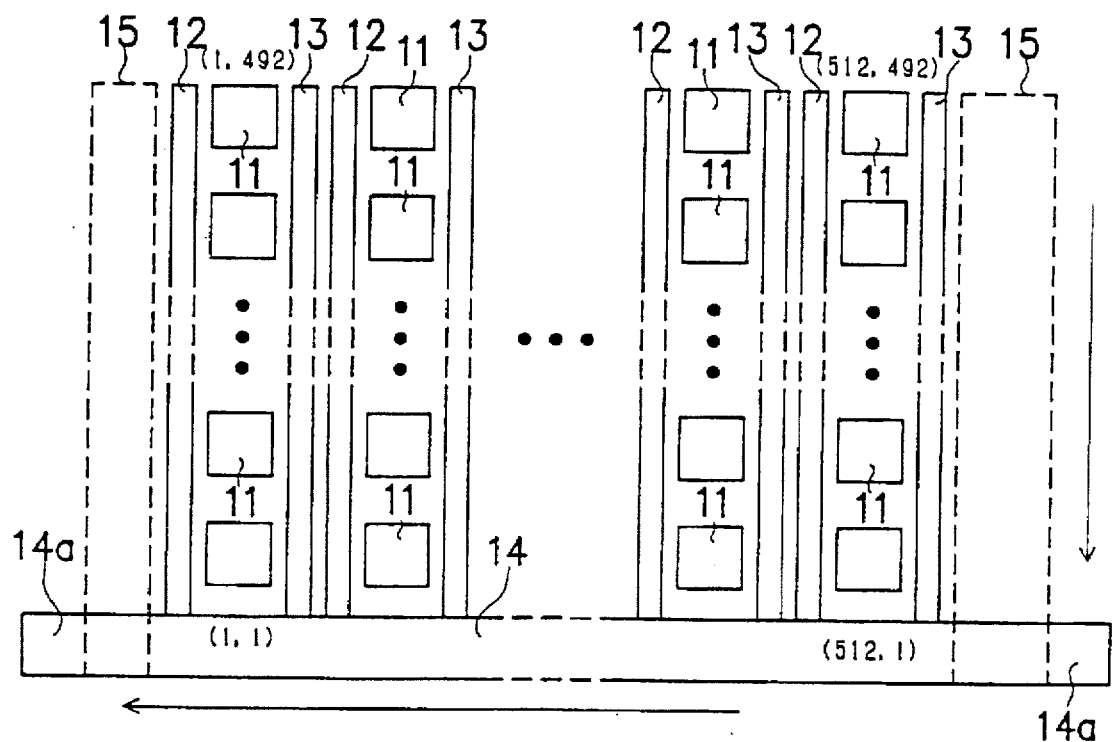
FIG. 4 is a block diagram of a CCD solid-state imaging device used in a second example according to the present invention.
Figure 5:
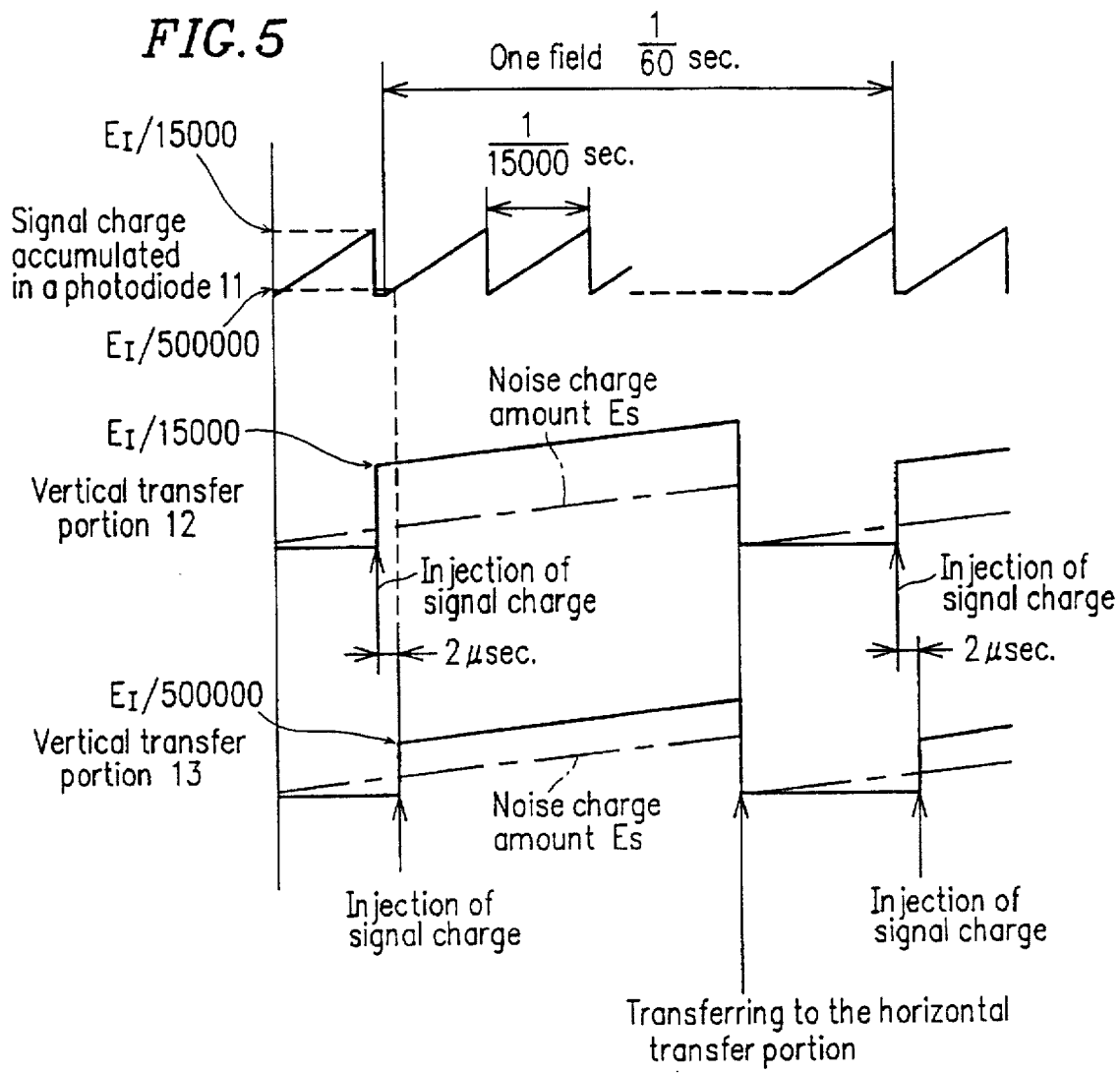
FIG. 5 is a time chart showing the timing at which signal charges are injected from photodiodes into vertical transfer portions.
Figure 6:
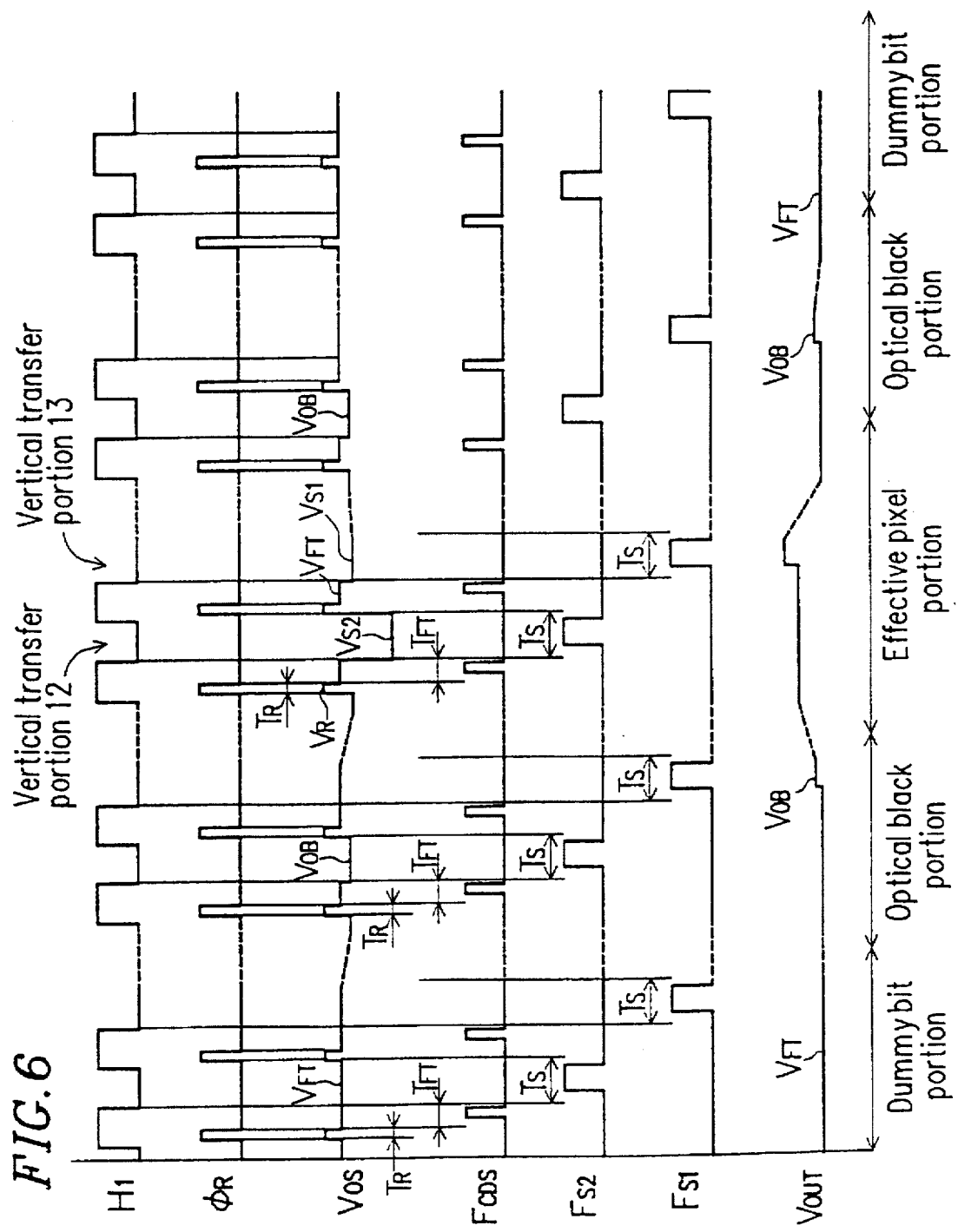
FIG. 6 is a time chart of various output signals in one horizontal scanning period for an output circuit of the second example.

A second embodiment of the present invention will be described with reference to FIGS. 4 to 6. FIG. 4 is a block diagram showing the structure of a CCD solid-state imaging device, FIG. 5 is a time chart showing the timing at which signal charges are injected from photodiodes into vertical transfer portions, and FIG. 6 is a time chart of various output signals for an output circuit of the CCD solid-state imaging device in one horizontal scanning period.

This example relates to an output circuit for an interline transfer type CCD solid-state imaging device having two-line vertical transfer portions as shown in FIG. 4. The configuration of the output circuit is the same as that of Example 1, i.e., the output circuit of FIG. 9 followed by the additional output circuit of FIG. 2.

The CCD solid-state imaging device for this example includes 512×492 photodiodes 11 to form an effective pixel portion. The photodiodes 11 act as light receiving elements which are arranged in a matrix as shown in FIG. 4. A pair of vertical transfer portions 12 and 13 each composed of CCD are disposed on the sides of each column of 492 photodiodes 11 symmetrically. Signal charges stored in the photodiodes 11 are injected into the adjacent pairs of vertical transfer portions 12 and 13 once every field period (1/60 seconds). The vertical transfer portions 12 and 13 then sequentially transfer the injected signal charges along a direction in which the vertical transfer portions 12 and 13 elongate before the start of the next field period.

In order to realize an electronic shutter function, the CCD solid-state imaging device shown in FIG. 4 drains signal charges stored in the photodiodes 11 into an overflow drain repeatedly at intervals determined by appropriately dividing one field period (1/60 seconds). For example, when the period for an electronic shutter is set to 1/15000 seconds, signal charges stored in the photodiodes 11 are drained into an overflow drain at a frequency of 15.734 kHz. As shown in FIG. 5, the vertical transfer portion 12 receives signal charges stored in the photodiodes 11 at the time immediately before the draining. On the other hand, the vertical transfer portion 13 receives signal charges stored in the photodiodes 11 at a timing as short as 2μ seconds after the draining. Accordingly, when the charge amount stored in each photodiode 11 for one second is $E_f$, the vertical transfer portion 12 receives a sufficient amount of signal charge, as much as $E_f/15000$ ($E_f \times 1/15000$), from each photodiode 11. On the other hand, the vertical transfer portion 13 receives a signal charge as little as $E_f/500000$ ($E_f \times 2\mu$ seconds) which is substantially equal to zero from each photodiode 11.

Charges generated by dark current and smears (hereinafter, referred to as noise charges) are also produced.

FIG. 5 shows such noise charges added in the vertical transfer portions 12 and 13 as a noise charge amount $E_S$. The noise charge amount $E_S$ gradually increases substantially over the entire field period. In FIG. 5, the noise charge amount $E_S$ is shown to linearly increase for simplification. Actually, however, the increase is not always linear, nor is the increase amount constant. For example, the increase of charges caused by smears depends on the amount of light received by the vertical transfer portions 12 and 13. The noise charge amount sharply increases in a portion irradiated with extremely intensive spot light. Though the increase in the amount of noise charges is not constant, the noise charge amounts $E_S$ in the vertical transfer portions 12 and 13 are substantially the same. This is because the vertical transfer portions 12 and 13 are disposed symmetrical to each other on the sides of each row of photodiodes 11. As a result, in the vertical transfer portion 12, a signal charge composed of the signal charge of $E_f/15000$ injected from each photodiode 11 and the noise charge amount $E_S$ is transferred toward a horizontal transfer portion 14 and output. On the other hand, in the vertical transfer portion 13, a signal charge substantially composed of only the noise charge amount $E_S$ is transferred downward and output.

The horizontal transfer portion 14 is disposed at the bottom ends of the vertical transfer portions 12 and 13, so that the signal charges output sequentially from the vertical transfer portions 12 and 13 are transferred horizontally in series. The signal charges transferred from one pair of the vertical transfer portions 12 and 13 which are disposed on the sides of the same photodiode 11 are positioned in adjacent transfer sections of the horizontal transfer portion 14. Such signal charges together with other signal charges synchronously transferred from the other pairs of vertical transfer portions 12 and 13 to respective transfer sections of the horizontal transfer portion 14 are then transferred in series leftwards as is seen from FIG. 4. The horizontal transfer portion 14 includes transfer sections twice the number of columns of photodiodes 11.

Optical black areas 15 are formed on the outermost sides of the array of photodiodes 11. The horizontal transfer portion 14 includes portions located under the optical black areas 15 and dummy bits 14a located at the both ends thereof. Each of the dummy bits 14a is composed of only a transfer portion. Thus, the horizontal transfer portion 14 first outputs pixel signals in one of the dummy bits 14a and pixel signals corresponding to one of the optical black areas 15 sequentially. Then, it outputs effective pixel signals transferred from the vertical transfer portions 12 and 13, followed by pixel signals corresponding to the other optical black area 15 and pixel signals in the other dummy bit 14a.

The output terminal of the horizontal transfer portion 14 is connected to the output circuit of FIG. 9 and the output circuit of Example 1 shown in FIG. 2 in series. However, the operation of the output circuit of this example is different from that of the output circuit of Example 1 in that: the sampling clock $F_{S1}$ controlling the samplings in the main sampling and holding circuit 2 and the synchronous sampling and holding circuit 4 and the sampling clock $F_{S2}$ controlling the sampling in the sub sampling and holding circuit 3 are active in the signal period $T_S$ of every other pixel signal.

The operation of the output circuit with the above configuration will be described with reference to the time chart of FIG. 6.

Pixel signals corresponding to the signal charges transferred from the vertical transfer portions 12 and 13 are alternately output from the horizontal transfer portion 14 of the CCD solid-state imaging device shown in FIG. 4. A signal level $V_{S2}$ of the pixel signal corresponding to the signal charge transferred from the vertical transfer portion 12 is sample-held in the sub sampling and holding circuit 3 under the control of the sampling clock $F_{S2}$. The output from the sub sampling and holding circuit 3 is again sample-held in the synchronous sampling and holding circuit 4 under the control of the sampling clock $F_{S1}$. A signal level $V_{S1}$ of the pixel signal corresponding to the signal charge transferred from the vertical transfer portion 13 is sample-held in the main sampling and holding circuit 2 under the control of the sampling clock $F_{S1}$.

The signal level $V_{S2}$ sample-held in the synchronous sampling and holding circuit 4 and the signal level $V_{S1}$ sample-held in the main sampling and holding circuit 2 are both supplied to the differential amplifier 5 for differential amplification. As described earlier, the signal level $V_{S2}$ is composed of the signal charge of $E_f/15000$ and the noise charge amount $E_S$ generated by smears and the like, while the signal level $V_{S1}$ is composed of the signal charge of $E_f/500000$ and the noise charge amount $E_S$ which is substantially equal to that of the signal level $V_{S2}$. Accordingly, the noise charge amount $E_S$ is canceled by calculating the difference between the signal levels $V_{S1}$ and $V_{S2}$ at the differential amplifier 5, eliminating the influence of dark current and smears. Since the signal charge of $E_f/500000$ of the signal level $V_{S1}$ is substantially zero, the original signal component will not be reduced by the differential operation between the signal levels $V_{S1}$ and $V_{S2}$. As in Example 1, reset noise can be eliminated by the clamp circuit 1, and the influence of pulse invasion can be eliminated by the synchronous samplings in the main sampling and holding circuit 2 and the synchronous sampling and holding circuit 4.

Thus, according to the output circuit of this example, the influence from dark current and smears which causes a variation in the optical black level $V_{OB}$, as well as influences of reset noise and pulse invasion can be eliminated from the output signal $V_{OUT}$.

In this example, the white level of the output signal $V_{OUT}$ is in a HIGH level as shown in FIG. 6. However, it can be in a LOW level as in Example 1 by interchanging the timings of the sampling clocks $F_{S1}$ and $F_{S2}$ with each other.

(EXAMPLE 3)

Figure 7:
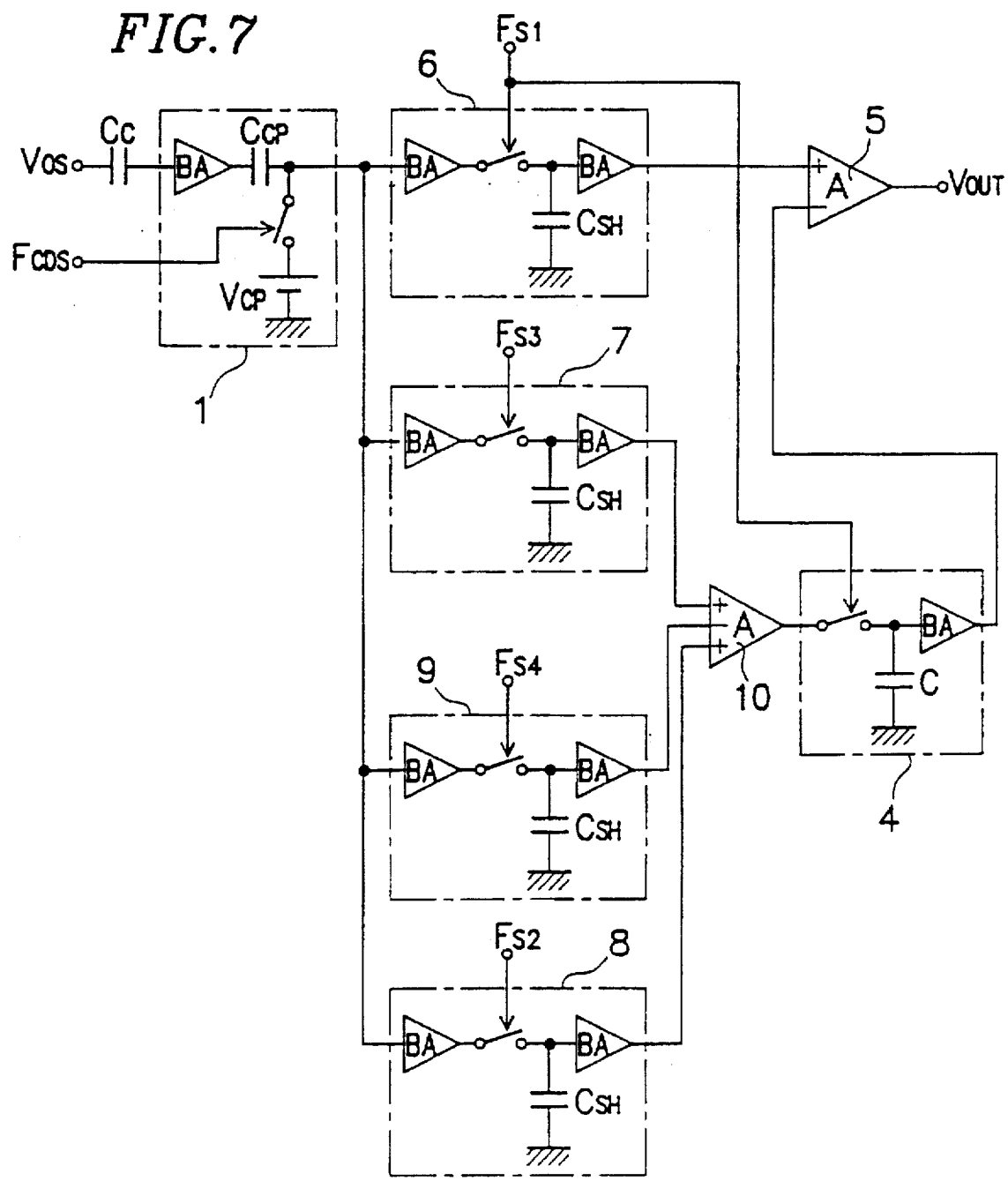
FIG. 7 is a circuit block diagram of an output circuit of a CCD solid-state imaging device, as a third example according to the present invention.
Figure 8:
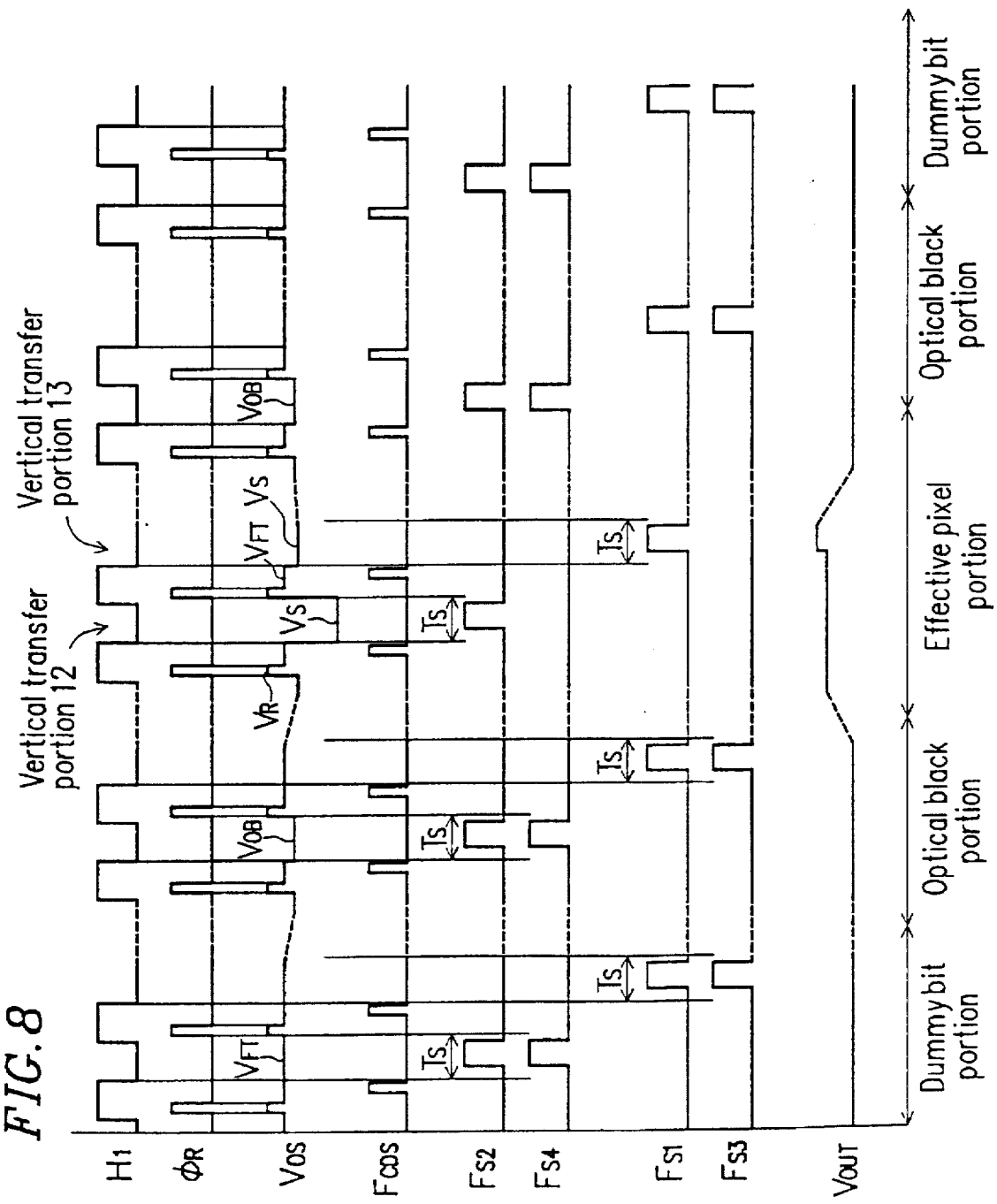
FIG. 8 is a time chart showing various output signals in one horizontal scanning period for the output circuit of the third example.

A third example of the present invention will be described with reference to FIGS. 7 and 8. FIG. 7 is a block diagram of an output circuit of a CCD solid-state imaging device, and FIG. 8 is a time chart of various output signals for the output circuit in one horizontal scanning period.

In this example, the output circuit of FIG. 7 is used, instead of the output circuit of FIG. 2, for the CCD solid-state imaging device having two-line vertical transfer portions described in Example 2. Components having similar functions to those of FIG. 2 are denoted by the same reference numerals.

Referring to FIG. 7, the output circuit of this example includes a clamp circuit 1, a first main sampling and holding circuit 6, a first sub sampling and holding circuit 7, a second main sampling and holding circuit 8, a second sub sampling and holding circuit 9, an arithmetic circuit 10, a synchronous sampling and holding circuit 4, and a differential amplifier 5. The clamp circuit 1 is the same in configuration as those of Examples 1 and 2, and eliminates reset noise by clamping the feedthrough level $V_{FT}$ in the feedthrough period $T_{FT}$ of each pixel signal of the converted voltage signal $V_{OS}$ to the clamp level $V_{CP}$.

The sampling and holding circuits 4, and 6 to 9 are almost the same in configuration. The main and sub sampling and holding circuits 6 to 9 sample pixel signals output from the clamp circuit i under the control of sampling clocks $F_{S1}$, $F_{S3}$, $F_{S2}$, and $F_{S4}$, respectively. The sampling clock $F_{S1}$ also controls the sampling of the synchronous sampling and holding circuit 4. The sampling clocks $F_{S1}$ and $F_{S2}$ are the same as those used in Example 2. The sampling clock $F_{S3}$ controls the sampling of the signal levels $V_S$ of every other pixel signal identical to those selected by the sampling clock $F_{S1}$, but only in the dummy bit portion and the optical black portion. The sampling clock $F_{S4}$ controls the sampling of the signal levels $V_S$ of every other pixel signal which have not been selected by the sampling clock $F_{S1}$ and are identical to those selected by the sampling clock $F_{S2}$, but only in the dummy bit portion and the optical black portion.

The arithmetic circuit 10 calculates the sum of the signal level $V_S$ sample-held by the first sub sampling and holding circuit 7 and the signal level $V_S$ sample-held by the second main sampling and holding circuit 8, and subtracts the signal level $V_S$ sample-held by the second sub sampling and holding circuit 9 from the above sum. The synchronous sampling and holding circuit 4 samples and holds the result from the arithmetic circuit 10 at the same timing as the first main sampling and holding circuit 6, and sends it to the differential amplifier 5.

The operation of the output circuit with the above configuration will be described with reference to the time chart of FIG. 8.

The difference between the signal level $V_S$ sample-held by the first main sampling and holding circuit 6 at the timing of the sampling clock $F_{S1}$ and the signal level $V_S$ sample-held by the first sub sampling and holding circuit 7 at the timing of the sampling clock $F_{S3}$ is calculated by the arithmetic circuit 10 and the differential amplifier 5. Also, the difference between the signal level $V_S$ sample-held by the second main sampling and holding circuit 8 at the timing of the sampling clock $F_{S2}$ and the signal level $V_S$ sample-held by the second sub sampling and holding circuit 9 at the timing of the sampling clock $F_{S4}$ is calculated by the arithmetic circuit 10. Accordingly, by using two types of pixel signals as described in Example 1, the signal level $V_S$ free from the influence of variation in the optical black level $V_{OB}$ can be obtained as in Example 1.

Further, since the difference between the above calculation results is calculated by the differential amplifier 5, the difference of the signal levels $V_S$ of the two types of pixel signals can also be obtained. Thus, the influence of dark current and smears which may cause a variation in the optical black level $V_{OB}$ can be eliminated as in Example 2. Moreover, since the first main sampling and holding circuit 6 and the synchronous sampling and holding circuit 4 uses the same sampling clock $F_{S1}$, the influence of pulse invasion which may occur at the samplings can be canceled in the differential amplifier 5.

Thus, according to the output circuit of this example, an influence of dark current and smears which causes variation in the optical black level $V_{OB}$, as well as influences of reset noise and pulse invasion, can be eliminated from the output signal $V_{OUT}$. Further, the influence of variation in the optical black level $V_{OB}$ can be eliminated. Moreover, the level of the output signal $V_{OUT}$ in the dummy bit portion and the optical black portion can be made homologous.

In the case where Examples 1 and 2 are simply combined so as to obtain the same effects as those in Example 3, a total of three synchronous sampling and holding circuits 4 are required. In this example, the arithmetic circuit 10 calculates the difference between the outputs from the second main sampling and holding circuit 8 and the second sub sampling and holding circuit 9, and also adds the output from the first sub sampling and holding circuit 7 to the above difference. By this operation, the output circuit of this example requires only one synchronous sampling and holding circuit, which simplifies the configuration of the output circuit.

In this example, as in Example 2, the white level of the output signal $V_{OUT}$ is in a HIGH level as shown in FIG. 8. However, it can be in a LOW level as in Example 1 by interchanging the timings of the sampling clocks $F_{S1}$ and $F_{S3}$ and the sampling clocks $F_{S2}$ and $F_{S4}$ with each other.

In the above examples, the output circuits for a CCD solid-state imaging device were described. The output circuits of the present invention are also applicable to a solid-state imaging device employing a BBD or other charge transfer devices. In Examples 1 and 3, the output circuits of the present invention may be provided only for the purpose of eliminating the influence of a variation in the optical black level $V_{OB}$ from the signal level $V_S$ of each pixel signal in the effective pixel portion. In such a case, the sub sampling and holding circuit 3 in Example 1 and the first sub sampling and holding circuit 7 and the second sub sampling and holding circuit 9 in Example 3 may be arranged so as to sample only the optical black level $V_{OB}$ in the signal period $T_S$ of each pixel signal in the optical black portion.

Thus, according to the output circuits of a solid-state imaging device of the present invention, the influence of a variation in the optical black level $V_{OB}$ and the influence of dark current and smears, as well as influences of reset noise and pulse invasion can be eliminated from the output signal $V_{OUT}$. Moreover, the level of the output signal $V_{OUT}$ in the dummy bit portion and the optical black portion can be made homologous. As a result, output signals with a high S/N ratio can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An output circuit of a solid-state imaging device, which receives a plurality of pixel signals in a dummy bit portion, an optical black portion and an effective pixel portion from a charge transfer device of the solid-state imaging device, the output circuit comprising:

a clamp circuit for clamping, to a predetermined voltage, a feedthrough level in a feedthrough period of each pixel signal output from a charge transfer device of the solid-state imaging device;

a main sampling and holding circuit for sampling a signal level in a signal period of each pixel signal output from the clamp circuit and holding the signal level;

a sub sampling and holding circuit for sampling an optical black level, in a signal period of each pixel signal in the optical black portion output from the clamp circuit, and holding the optical black level;

a synchronous sampling and holding circuit for sampling the optical black level, output from the sub sampling and holding circuit, at a timing identical to that of the main sampling and holding circuit, and holding the optical black level; and an arithmetic circuit for calculating the difference between the signal level output from the main sampling and holding circuit and the optical black level output from the synchronous sampling and holding circuit;

wherein the sub sampling and holding circuit samples the optical black level in the signal period of each pixel signal in the optical black portion and a feedthrough level in a signal period of each pixel signal in the dummy bit portion output from the clamp circuit, and holds the optical black level or the feedthrough level, and the synchronous sampling and holding circuit samples the optical black level or the feedthrough level output from the sub sampling and holding circuit at a timing identical to that of the main sampling and holding circuit, and holds the optical black level or the feedthrough level.

2. An output circuit according to claim 1, wherein the charge transfer device is a CCD.

3. An output circuit according to claim 1, wherein the solid-state imaging device is a CCD.

4. An output circuit of a solid-state imaging device, the solid-state imaging device being of an interline transfer type including a charge transfer device having: pairs of vertical transfer portions for receiving signal charges injected thereinto in parallel from rows of light receiving elements and transferring the received signal charges in series in a vertical direction, each of the pairs of vertical transfer portions being disposed substantially symmetrically on both sides of each of the rows of light receiving elements so that signal charges be injected into the pair of vertical transfer portions from the same light receiving elements at different times when the amounts of the signal charges are different; and a horizontal transfer portion for transferring the signal charges transferred from the pairs of vertical transfer portions in a horizontal direction, the output circuit receiving a plurality of pixel signals in a dummy bit portion, an optical black portion and an effective pixel portion from the charge transfer device, comprising:

a clamp circuit for clamping to a predetermined voltage a feedthrough level in a feedthrough period of each pixel signal output from the horizontal transfer portion;

a first sampling and holding circuit for sampling a signal level in a signal period of every other pixel signal output from the clamp circuit and holding the signal level;

a second sampling and holding circuit for sampling a signal level in a signal period of remaining pixel signals output from the clamp circuit which are not sampled by the first sampling and holding circuit and holding the signal level;

a synchronous sampling and holding circuit for sampling the signal level output from the second sampling and holding circuit at a timing identical to that of the first sampling and holding circuit and holding the signal level; and an arithmetic circuit for calculating the difference between the signal levels output from the first sampling and holding circuit and the synchronous sampling and holding circuit.

5. An output circuit according to claim 4, wherein the solid-state imaging device is a CCD.

6. An output circuit of a solid-state imaging device, the solid-state imaging device being of an interline transfer type including a charge transfer device having: pairs of vertical transfer portions for receiving signal charges injected thereinto in parallel from rows of light receiving elements and transferring the received signal charges in series in a vertical direction, each of the pairs of vertical transfer portions being disposed substantially symmetrically on both sides of each row of light receiving elements so that signal charges be injected into the pair of vertical transfer portions from the same light receiving elements at different times when the amounts of the signal charges are different; and a horizontal transfer portion for transferring the signal charges transferred from the pairs of vertical transfer portions in a horizontal direction, the output circuit receiving a plurality of pixel signals in a dummy bit portion, an optical black portion and an effective pixel portion from the charge transfer device, comprising:

a clamp circuit for clamping to a predetermined voltage a feedthrough level in a feedthrough period of each pixel signal output from the horizontal transfer portion;

a first main sampling and holding circuit for sampling a signal level in a signal period of every other pixel signal output from the clamp circuit and holding the signal level;

a first sub sampling and holding circuit for sampling an optical black level in a signal period of each pixel signal in the optical black portion among the pixel signals which are output from the clamp circuit and sampled by the first main sampling and holding circuit and holding the optical black level;

a second main sampling and holding circuit for sampling a signal level in a signal period of pixel signals which are not sampled by the first main sampling and holding circuit and holding the signal level;

a second sub sampling and holding circuit for sampling an optical black level in a signal period of each pixel signal in the optical black portion among the pixel signals which are output from the clamp circuit and sampled by the second main sampling and holding circuit and holding the optical black level;

a first arithmetic circuit for calculating the sum of the optical black level output from the first sub sampling and holding circuit and the signal level output from the second main sampling and holding circuit and subtracting from the sum the optical black level output from the second sub sampling and holding circuit;

a synchronous sampling and holding circuit for sampling an arithmetic signal output from the first arithmetic circuit at a timing identical to that of the first main sampling and holding circuit and holding the arithmetic signal; and a second arithmetic circuit for calculating the difference between the signal level output from the first main sampling and holding circuit and the arithmetic signal output from the synchronous sampling and holding circuit.

7. An output circuit according to claim 6, wherein the first sub sampling and holding circuit samples the optical black level in the signal period of each pixel signal in the optical black portion and a feedthrough level in a signal period of every pixel signal in the dummy bit portion among the pixel signals output from the clamp circuit and sampled by the first main sampling and holding circuit, and holds the optical black level or the feedthrough level, the second sub sampling and holding circuit samples the optical black level in the signal period of each pixel signal in the optical black portion and a feedthrough level in a signal period of each pixel signal in the dummy bit portion among the pixel signals output from the clamp circuit and sampled by the second main sampling and holding circuit, and holds the optical black level or the feedthrough level, and the first arithmetic circuit calculates the sum of the optical black level or the feedthrough level output from the first sub sampling and holding circuit and the signal level output from the second main sampling and holding circuit and subtracting from the sum the optical black level or the feedthrough level output from the second sub sampling and holding circuit.

8. An output device according to claim 7, where the charge transfer device is a CCD.

9. An output circuit according to claim 6, wherein the solid-state imaging device is a CCD.

10. An output circuit of a solid-state imaging device, which receives a plurality of pixel signals in a dummy bit portion, an optical black portion and an effective pixel portion from a charge transfer device of the solid-state imaging device, the output circuit comprising:

a clamp circuit for clamping, to a predetermined voltage, a feedthrough level in a feedthrough period of each pixel signal, output from a charge transfer device of the solid-state imaging device;

a main sampling and holding circuit for sampling a signal level in a signal period of each pixel signal, output from the clamp circuit, and holding the signal level;

a sub sampling and holding circuit for sampling an optical black level in a signal period of each pixel signal in the optical black portion output from the clamp circuit, and holding the optical black level; and an arithmetic circuit for calculating the difference between the signal level output from the main sampling and holding circuit and the optical black level output from the sub sampling and holding circuit, wherein the sub sampling and holding circuit samples the optical black level in the signal period of each pixel signal in the optical black portion, and samples a feedthrough level in a signal period of each pixel signal in the dummy bit portion output from the clamp circuit, and holds the optical black level or the feedthrough level.

* * * * *